(12) United States Patent
Low et al.

(10) Patent No.: US 11,712,906 B2
(45) Date of Patent: Aug. 1, 2023

(54) ILLUMINATOR CALIBRATIONS FOR MEDIA EDGE DETECTIONS

(71) Applicant: Hewlett-Packard Development Company, L.P., Spring, TX (US)

(72) Inventors: Tong Nam Samuel Low, Singapore (SG); Yu Zhao, Singapore (SG); Xiaoxi Huang, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 518 days.

(21) Appl. No.: 16/763,021

(22) PCT Filed: Nov. 17, 2017

(86) PCT No.: PCT/US2017/062214
§ 371 (c)(1),
(2) Date: May 11, 2020

(87) PCT Pub. No.: WO2019/099021
PCT Pub. Date: May 23, 2019

(65) Prior Publication Data
US 2021/0370691 A1    Dec. 2, 2021

(51) Int. Cl.
*B41J 11/00* (2006.01)
*H04N 1/00* (2006.01)

(52) U.S. Cl.
CPC ...... *B41J 11/0095* (2013.01); *H04N 1/00034* (2013.01); *H04N 1/00087* (2013.01); *H04N 1/00655* (2013.01)

(58) Field of Classification Search
CPC .......... B41J 11/0095; H04N 1/00034; H04N 1/00087; H04N 1/00655
See application file for complete search history.

(56) References Cited

U.S. PATENT DOCUMENTS 5,856,833 A    1/1999  Elgee
5,971,276 A   10/1999  Sano et al.
(Continued)

FOREIGN PATENT DOCUMENTS

CN    1315659 C     5/2007
CN  100355584 C    12/2007
(Continued)

OTHER PUBLICATIONS

Micro-Vu Corporation ~ Q16 Metrology Computer E50 Optical Edge Detector Ed51 Video Edge Detector, Mar. 15, 2002, http://www.inspectionengineering ~ 70 pages.

*Primary Examiner* — Thinh H Nguyen
(74) *Attorney, Agent, or Firm* — Brooks, Cameron & Huebsch, PLLC (57) ABSTRACT

An apparatus including an illuminator to emit light on a media to be printed on is provided. The apparatus also includes an optical sensor disposed proximate to the illuminator to detect an amount of reflected light. In addition, the apparatus includes a processor to control the illuminator and the optical sensor. The processor is to calibrate the illuminator to determine a first brightness level for high sensitivity at the optical sensor. The processor is to calibrate the illuminator to determine a second brightness level iteratively based on a signal to noise ratio. The processor is to compare the second brightness level with the first brightness level to determine whether to proceed with detection of an edge of the media using the second brightness level.

17 Claims, 7 Drawing Sheets

(56) References Cited

U.S. PATENT DOCUMENTS

| | | |
|---|---|---|
| 6,325,505 B1 | 12/2001 | Walker |
| 6,561,643 B1 | 5/2003 | Walker |
| 7,327,502 B2 | 2/2008 | Sheng |
| 8,033,544 B2 | 10/2011 | Dondiego et al. |
| 8,469,482 B2 | 6/2013 | Pawlik |
| 9,509,877 B1 | 11/2016 | Barnes et al. |
| 2005/0109961 A1 | 5/2005 | Bittner |
| 2006/0133650 A1 | 6/2006 | Xie |
| 2006/0165292 A1 | 7/2006 | Li |
| 2007/0076074 A1* | 4/2007 | Zhang .................. B41J 11/009 347/101 |
| 2011/0096118 A1* | 4/2011 | Burke .................. B41J 11/009 347/19 |
| 2013/0194622 A1 | 8/2013 | Low et al. |

FOREIGN PATENT DOCUMENTS

| | | |
|---|---|---|
| CN | 103309194 A | 9/2013 |
| JP | 2014-179885 A | 9/2014 |

\* cited by examiner

ILLUMINATOR CALIBRATIONS FOR MEDIA EDGE DETECTIONS

BACKGROUND

Print apparatus are capable of printing on media of varying sizes. Some print apparatus may detect the size of the media onto which content is to be printed. In addition, print apparatus are generally capable of printing on a wide variety of media, including ordinary plain white, glossy, semi-glossy, matte-finish, and dark colored paper media as well as non-paper media, such as plastics, vinyls, or fabrics. Accordingly, print apparatus may use a sensing mechanism capable of detecting various media sizes and media types.

BRIEF DESCRIPTION OF THE DRAWINGS

Reference will now be made, by way of example only, to the accompanying drawings in which.

DETAILED DESCRIPTION

In the following description and figures, some example implementations of print apparatus, print systems, and/or methods to adjust operation of an imaging device are described. In examples described herein, a print system may be a device or a plurality of devices to print content on physical media, such as paper, with a print fluid, such as ink or toner. An example of print fluid is a substance ejectable from a printhead, such as ink, toner, gloss enhancer, a reflective enhancer, fluorescing agents, and the like.

In addition, print apparatus generally accept media in many different forms and sizes. Accordingly, print apparatus may be capable to detect the size and type of media to be printed on automatically. The automatic detection may be carried out through measurements of reflectance values at an optical sensor with a light source to emit light onto the media. In particular, the media reflects light emitted from the light source differently than the reflected light from an area with no media present, such as on a platen of the print apparatus. However, in some instances, the difference between the two surfaces may not be significant and factors such as noise may make distinguishing the media from the platen difficult.

Therefore, the utilization of a light source and optical sensor to measure reflectance may provide erroneous identification of an edge of media and result in a print apparatus failure to print to the edge of the media. Furthermore, as a printer is used over a time period, aerosol or other contaminants from printing operations may coat the sensor, the light source, and/or an optional cover to protect the sensor and the light source such that light measured at the sensor may include noise from light reflected off contaminants or absorbed by the contaminants. In addition, use of an option cover to protect the sensor and the light source may introduce further noise. While a periodic calibration that adjusts the intensity of the light source such that the light received at the sensor is maintained in a range of high sensitivity, this calibration may not address the issue of noise introduced by contaminants. Further, such calibrations are typically performed during non-printing periods such as at startup or shutdown, or when printhead and/or ink cartridges are replaced, or when a printhead alignment calibration is manually triggered. Thus, for printers that typically carry out long print runs with infrequent power-downs and infrequent printhead or cartridge changes, misidentification of media size and failure to print near an edge of a media are more likely.

Various examples described herein are developed to provide an apparatus, a method, and a machine-readable storage medium encoded with instructions to enable a media edge calibration service for an illuminator and an optical sensor that measures light from the illuminator as reflected off a media or platen of the apparatus. The service may be used during printing operations, such as prior to the printing of each piece of media in a print job, to improve the edge detection of media and to avoid missed print areas on the media. In particular, the service is to be particularly useful for large media where missed print areas may result in waste of the entire media which may be costly.

Figure 1:
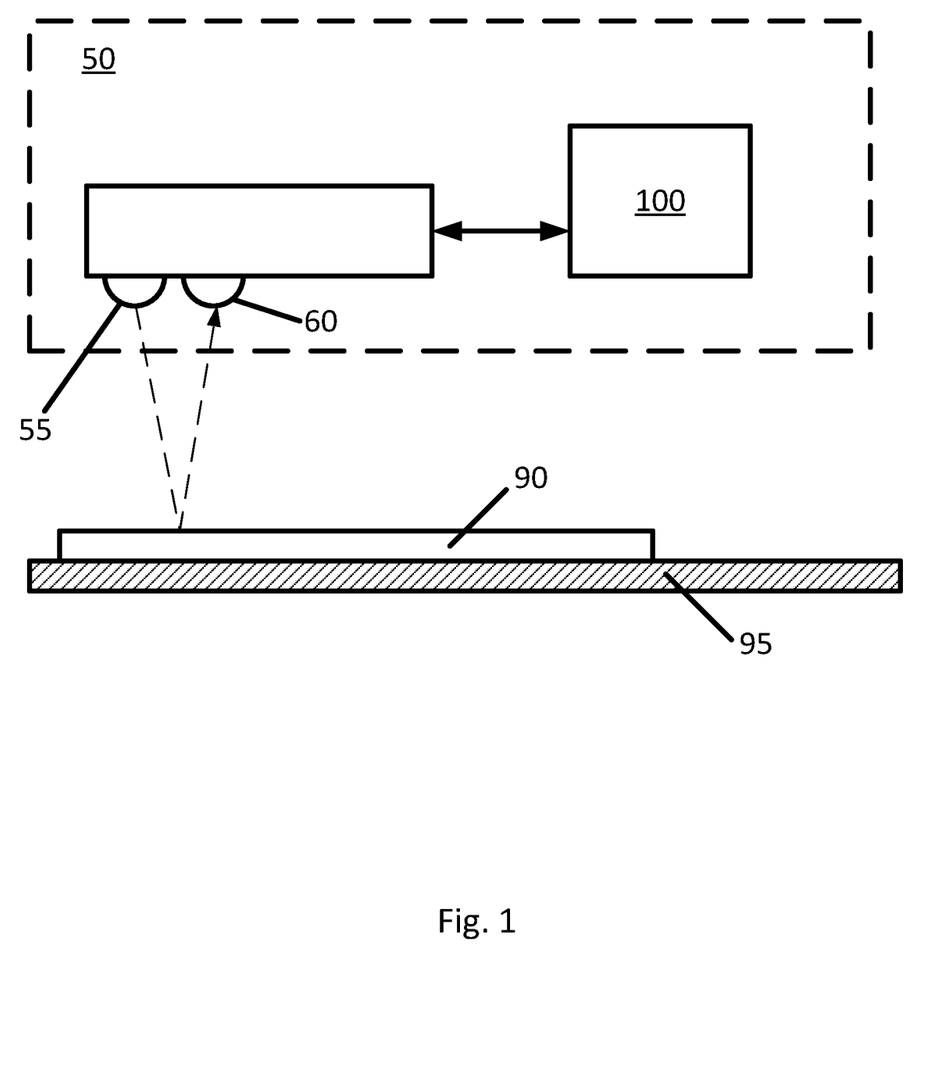
FIG. 1 is a diagram of an example apparatus.

Referring to FIG. 1, an apparatus 50 to detect media 90 is generally shown. In particular, the apparatus 50 is to detect an edge of the media 90 that passes over a platen 95. In the present example, the apparatus 50 is for an ink jet printer to print on large sheets of media, such as for a poster. However, in other examples, the apparatus 50 may be for other types of print systems. In the present example, the apparatus 50 includes an illuminator 55, an optical sensor 60, and a processor 100.

The illuminator 55 is to emit light on the media 90 or on the platen 95 where no media is present. The illuminator 55 may be any type of light source. In the present example, the illuminator 55 is a light emitting diode ("LED") to emit a broad spectrum of light. In other examples, the illuminator 55 may emit light at a non-visible wavelength, such as infrared or ultraviolet. In further examples, the illuminator 55 may also be an LED to emit light in a band of colored light. Furthermore, the illuminator 55 is not necessarily an LED and may be any other type of light source such as a laser or filament light source.

In the present example, the illuminator 55 is capable of emitting light at varying brightness levels. The manner by which the illuminator 55 emits light at varying brightness levels is not limited and may involve adjustment of a voltage applied to the illuminator 55, such as with a fixed biasing resistor, or by adjustment of the current at a current source. In other examples, the brightness level of the illuminator 55 may be adjusted with a shutter.

In the present example, the optical sensor 60 is disposed proximate to the illuminator 55 and at a fixed relative position. The optical sensor 60 is to detect an amount of reflected light, such as from the media 90 or the platen 95. The manner by which the optical sensor 60 detects light is not limited and may include many different types of photosensors and/or photodetectors, such as CMOS detectors, CCD detectors, photovoltaic cells, photodiodes, or a phototransistor. It is to be appreciated by a person of skill that while the optical sensor 60 targets the detection of reflected light, any light that is incident on the optical sensor 60 will be detected. Accordingly, noise introduced from additional light sources or unintended reflected light from other components of the apparatus 50 or overall print system in general.

In the present example, the response of the optical sensor 60 may not have a linear relationship between the measured intensity of incident light on the optical sensor 60 and an output from the optical sensor 60, such as an output voltage. In many cases the response of the optical sensor 60 is dependent on the intensity of the light incident on the optical sensor 60. Although the relationship between light intensity and voltage may not be linear, the optical sensor 60 generally has a linear response range where the relationship between the light intensity received at the optical sensor 60 and the output voltage has an approximately linear relationship that provides high sensitivity for the detected light.

The processor 100 may include a central processing unit (CPU), a microcontroller, a microprocessor, a processing core, a field-programmable gate array (FPGA), or similar. In the present example, the processor 100 is coupled to the illuminator 55 and the optical sensor 60. The processor 100 executes instructions to control the illuminator 55 and the optical sensor 60 in general.

In addition, the processor 100 is to calibrate the illuminator 55 detect an edge of the media 90. In particular, the processor 100 is to calibrate the illuminator 55 to determine a brightness level that provides reflected light to the optical sensor 60 within a high sensitivity range. The manner by which the brightness level for high sensitivity at the optical sensor 60 is determined is not limited and may include a wide variety of methods. For example, the illuminator 55 and optical sensor 60 may be pre-calibrated based on a plurality of standard setups which include known types and models of the illuminator 55, the optical sensor 60 and the physical print system configuration. The processor 100 may then select the brightness level from a database of know setups. As another example, the processor 100 may carry out a calibration algorithm to determine the brightness level based on real time data from the optical sensor. For example, calibrations such as Auto Pen Alignment (APA) and SHELAC (Swath Height Error Line Advance Calibration) may be carried out. In other examples, the processor 100 may incrementally increase the brightness level of the illuminator 55 and select a brightness level just below saturation.

In addition, the processor 100 is also to calibrate the illuminator 55 to determine another brightness level based on a signal to noise ratio. The source of the noise is not limited and may be caused by other components of the apparatus 50, the print system as a whole, or external factors such as ambient light. For example, the noise may arise from reflections off other surfaces in the apparatus 50 or from external light that leaks onto the optical sensor 60. Effects of noise from external sources may be reduced with increases to the brightness level of the illuminator 55; however, increase of the brightness level of the illuminator 55 may lead to an increase of noise from unintended reflections. In the present example, the processor 100 may increase the brightness level of the illuminator 55 in an iterative manner until the signal to noise ratio reaches a threshold value. In this example, as the brightness level of the illuminator 55 increases, light noise is assumed to originate from reflections off surfaces other than the surfaces of the intended media 90 or the platen 95. The threshold value is not limited and may be a predetermined value or a function of the measured brightness level. This brightness level represents a high brightness level to measure the contrast between the media 90, which is generally reflective, and the platen 95 below the media 90, which generally absorbs light.

Upon determination of the brightness level for high sensitivity and the brightness level based on the signal to noise ratio, the processor 100 compares the two brightness levels to determine whether the detection of an edge of the media 90 is to proceed, for example, automatically, or whether the apparatus 50 is to stop the print job and prompt human intervention to avoid wastage of the media 90 with a failed print job, such as an inability to print to the edge of the media 90. The manner by which an automated detection of an edge occurs is not particularly limited. In the present example, the illuminator 55 is set to the brightness level based off the signal to noise ratio to carry out the edge detection.

Figure 2:
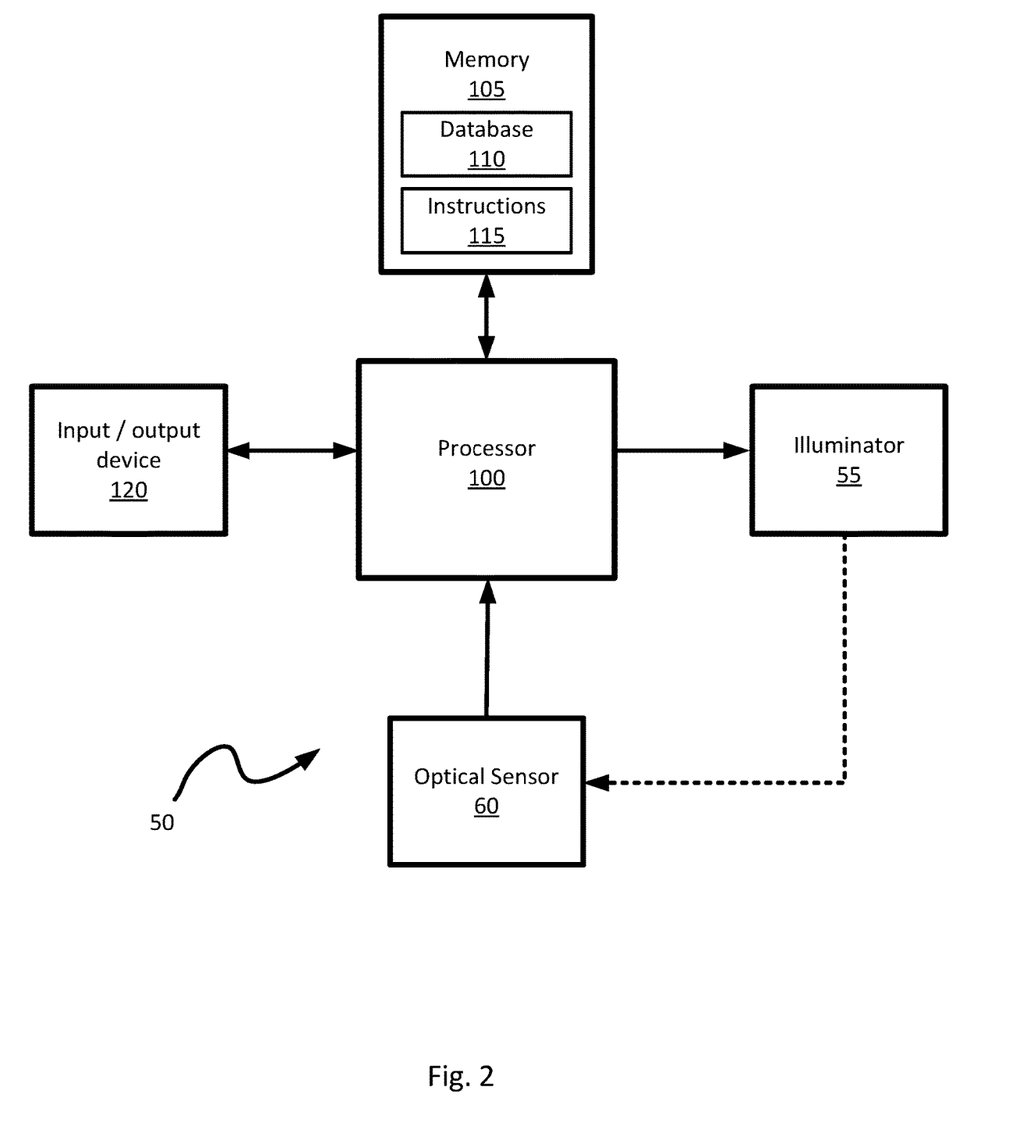
FIG. 2 is a block diagram of components of the example apparatus of FIG. 1.

Referring to FIG. 2, a schematic diagram of the apparatus 50 illustrates the internal electronics in greater detail is shown. In the present example, the apparatus 50 also includes a memory 105 in communication with the processor and an input/output device 120 to communicate with the processor 100.

The memory 105 is coupled to the processor 100 and may include a non-transitory machine-readable storage medium that may be any electronic, magnetic, optical, or other physical storage device. In the present example, the memory 105 stores a database 110. The database 110 may include a plurality of calibrations for various setups as well as predetermined threshold limits. In addition, the database 110 may store the brightness levels determined by the processor 100 as described above.

The memory 105 may also store executable instructions 115. In the present example, the executable instructions 115 may include a set of instructions to detect carry out various functions of the apparatus 50 and to control the illuminator 55 as well as read data from the optical sensor 60. In addition, the instructions 115 may be used to direct the processor 100 to send or receive data or messages via the input/output device 120.

The memory 105 may also store an operating system that is executable by the processor 100 to provide general functionality to the apparatus 50, for example, functionality to support various applications such as a user interface (not shown) to access various features of the apparatus 50. Examples of operating systems include Windows™, macOS™, iOS™, Android™, Linux™, Unix™, or a specialized embedded firmware. The memory 105 may additionally store applications that are executable by the processor 100 to provide specific functionality to the apparatus 50, such as automated media detection or print functions.

The input/output device 120 of the apparatus 50 is in communication with the processor 100. The input/output device 120 is not particularly limited and may include a button, a keyboard, a pointer device, a touch sensitive device, a button, a microphone, or any other device to generate signals upon activation from a user to provide user input to the processor 100, which may be used to control the functionality of the apparatus 50. For example, user input may include entry of media information, such as size and type, to start a calibration procedure. In other examples, the input/output device 120 may include a display screen or lights to indicate a status of the apparatus 50. In other examples, the input/output device 120 may be a touch screen capable of both input and output functions. In further examples, the input/output device 120 may be a communications interface to communicate with a connected device or a network, such as the wireless network, where the input is received from another electronic device. For example, the apparatus 50 may be connected to a computer (not shown) via a wireless connection or a peer-to-peer connection, such as a USB connection, which may provide user input.

Figure 3:
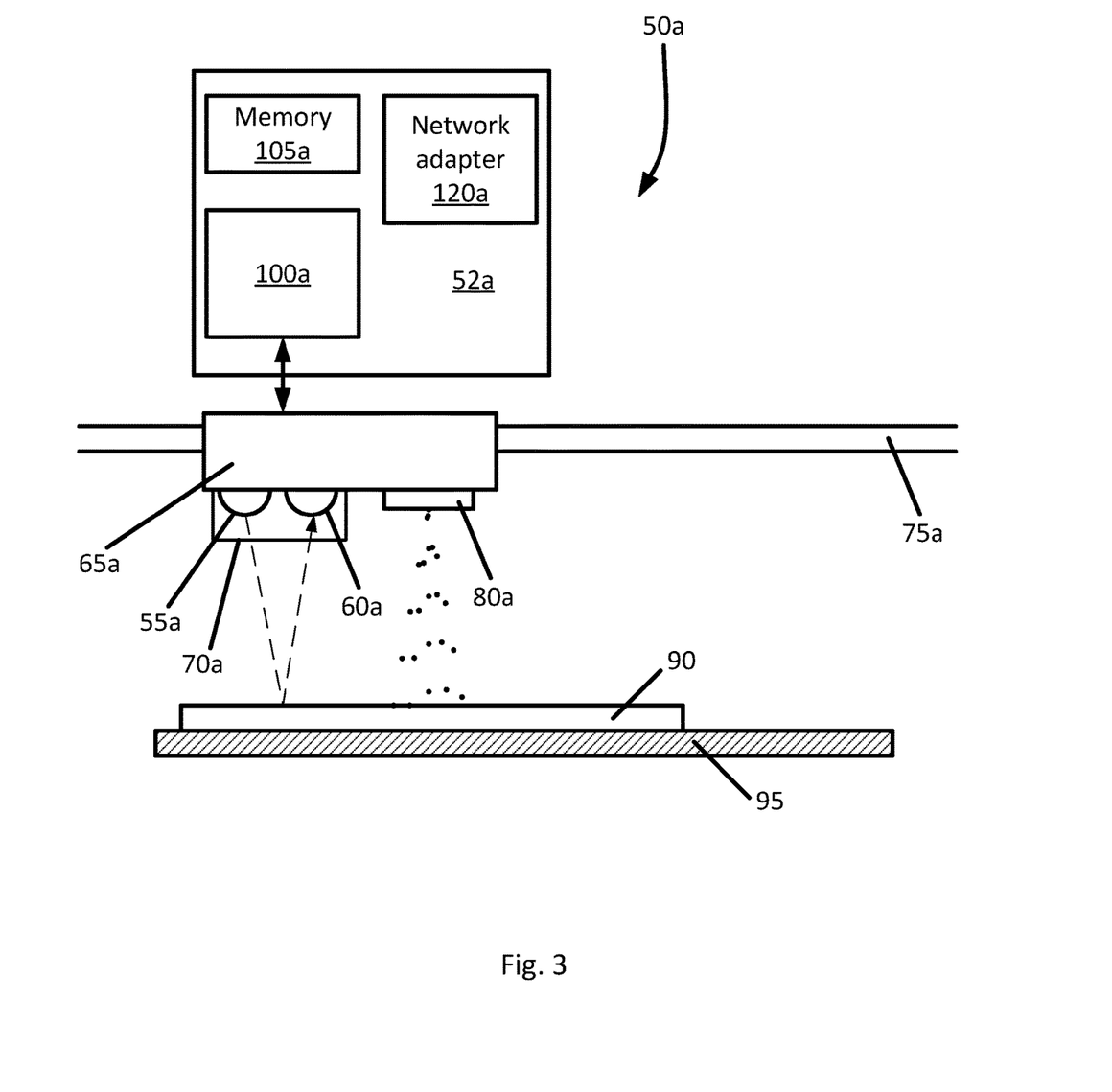
FIG. 3 is a diagram of another example apparatus.

Referring to FIG. 3, another apparatus 50*a* to detect media 90 is generally shown. Like components of the apparatus 50*a* bear like reference to their counterparts in the print system 50, except followed by the suffix "a". In this example, the apparatus 50a is to detect an edge of the media 90 that passes over a platen 95. The apparatus 50a includes a controller 52a, an illuminator 55a, an optical sensor 60a, a carriage 65a, a cover 70a, a guide bar 75a, and a printhead 80a.

The controller 52a is to control the apparatus. In the present example, the controller includes a processor 100a, a memory 105a, and a network communications interface 120a. The network communications interface 120a may be coupled to the processor 100a and allows the processor 100a to receive data and instructions over a network from another computing device. In the present example, the network communications interface 120a communicates with a network, such as the Internet or a local network, and receives data via the network. The network provides a link to another device, such as a content provider, a personal computer, a mobile computing device, or any other device from which an instructions and content may be provided.

In the present example, the carriage 65a houses various components of the apparatus 50a. For example, the carriage 65a holds the illuminator 55a, the optical sensor 60a, and the printhead 80a. The carriage 65a provides a rigid support to allow the printhead 80a to be mounted at a fixed position relative to the illuminator 55a and the optical sensor 60a. Accordingly, the geometry of the illuminator 55a, the optical sensor 60a, and the printhead 80a remain constant during any movement of the carriage 65a, such as during a print job.

In the present example, the cover 70a is to protect the illuminator 55a and the optical sensor 60a. However, as shown in FIG. 2, since the cover 70a is disposed over both the illuminator 55a and the optical sensor 60a, the surfaces of the cover 70a will provide internal reflections to produce noise. In addition, the cover 70a reduces the contaminants, such as aerosols or particulate matter, from reaching the illuminator 55a and the optical sensor 60a. Instead, the contaminants are blocked by the cover 70a which may be removable to clean or replace in some examples. The blockage of contaminants from the illuminator 55a and the optical sensor 60a allows for contaminants to adhere to the cover 70a and reduce the performance of the apparatus 50a. In particular, contaminants on the cover 70a may absorb or reflect more of the light from the illuminator 55a to introduce additional noise at the optical sensor 60a. As the apparatus 50a prints on more media over time, the issue with contaminants may continue to decrease the transparency and/or increase the internal reflectance of the cover 70a (i.e. reflected light from the illuminator 55a directly to the optical sensor 60a off the internal surface of the cover 70a). Periodically, the cover 70a may be cleaned and/or replaced. Accordingly, the amount of noise introduced by the cover 70a may fluctuate over the course of the life of the apparatus 50a.

The guide bar 75a is configured to support the carriage 65a. In the present example, the carriage 65a is slidably mounted to the guide bar 75a such that the carriage may move along the guide bar 75a. The manner by which the carriage 65a moves is not particularly limited and may include a motor to move a belt or chain along the guide bar 75a. In the present example, the controller 52a may control the movement of the carriage 65a along the guide bar 75a via instructions provided to the carriage 65a or mechanism to move the carriage 65a. In terms of physical support, the guide bar 75a is mechanically structured to support the carriage 65a, and its associated movement. For example, the guide bar 75a is constructed such that it is rigid enough to suspended the carriage above the media 90.

The printhead 80a is to transfer a print fluid onto the media 90 during the printing process. In this example, the printhead 80a is controlled by the controller 52a which directs the printhead 80a to dispend the print fluid at specific locations on the media 90. For example, a print system may feed the media 90 under the guide bar 75a with a roller system (not shown). The media 90 passes over a platen 95 and the printhead 80a may move along the guide bar 75a to be positioned at a location above the media 90. The controller 52a may then direct the printhead 80a to dispense an amount of print fluid onto the media 90.

Figure 4:
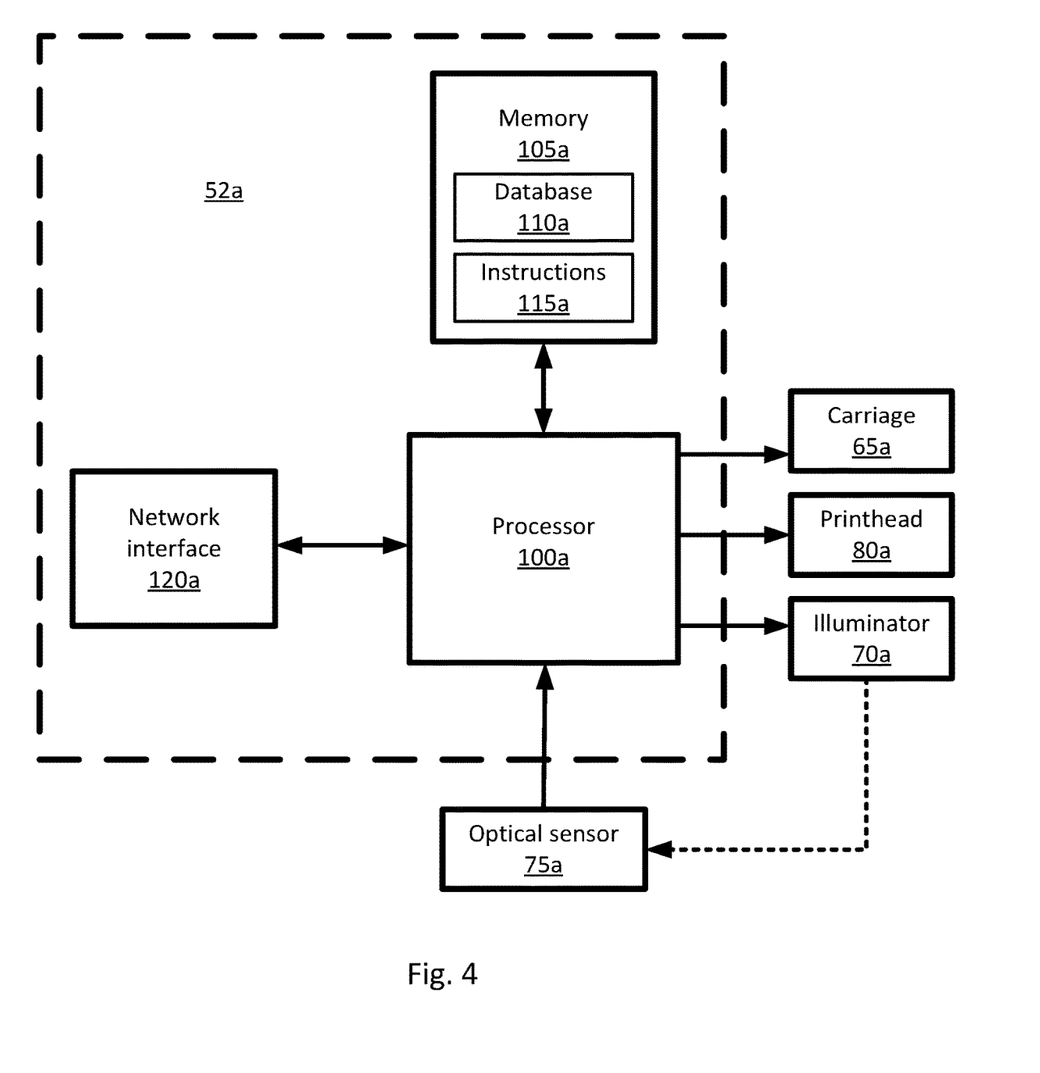
FIG. 4 is a block diagram of components of the example apparatus of FIG. 3.

Referring to FIG. 4, a schematic diagram of the controller 52a illustrates the internal electronics in greater detail is shown. In the present example, the controller 52a also includes a memory 105a in communication with the processor and network communications interface 120a to communicate with the processor 100a.

The memory 105a is coupled to the processor 100a and may include a non-transitory machine-readable storage medium that may be any electronic, magnetic, optical, or other physical storage device. In the present example, the memory 105a stores a database 110a. The database 110a may include a plurality of calibrations for various setups as well as predetermined threshold limits. In addition, the database 110a may store the brightness levels determined by the processor 100a as described above. Furthermore, in this example, the memory 105a may store content, such as images or documents, to print received via the network communications interface 120a.

The memory 105a may also store executable instructions 115a. In the present example, the executable instructions 115a may include a set of instructions to detect carry out various functions of the apparatus 50a and to control the illuminator 55a as well as read data from the optical sensor 60a. In addition, the instructions 115a may be used to direct the processor 100a to control the movement of the carriage 65a along the guide bar 75a as well as the control the dispensing of print fluid from the printhead 80a.

The memory 105a may also store an operating system that is executable by the processor 100a to provide general functionality to the controller 52a, for example, functionality to support various applications such as a user interface (not shown) to access various features of the controller 52a. Examples of operating systems include Windows™, macOS™, iOS™, Android™, Linux™, Unix™, or a specialized embedded firmware. The memory 105a may additionally store applications that are executable by the processor 100a to provide specific functionality to the controller 52a.

The network communications interface 120a of the controller 52a is in communication with the processor 100a. In other examples, the network communications interface 120a may be to communicate with a connected device or a network, such as the wireless network, where the input is received from another electronic device. For example, the controller 52a may be connected to a computer (not shown) via a wireless connection or a peer-to-peer connection, such as a USB connection, which may provide user input.

Variations are contemplated. Although the present example of the apparatus 50a includes a controller 52a, an illuminator 55a, an optical sensor 60a, a carriage 65a, a cover 70a, a guide bar 75a, and a printhead 80a, one or more of these components may be omitted. For example, the apparatus 50a may not include a guide bar 75a and have another means to move the carriage 65a. As another example, the cover 70a may be substituted with separate covers, each cover to protect either the illuminator 55a or the optical sensor 60a. As another example, only one of the illuminator 55a or the optical sensor 60a may be covered.

Figure 5:
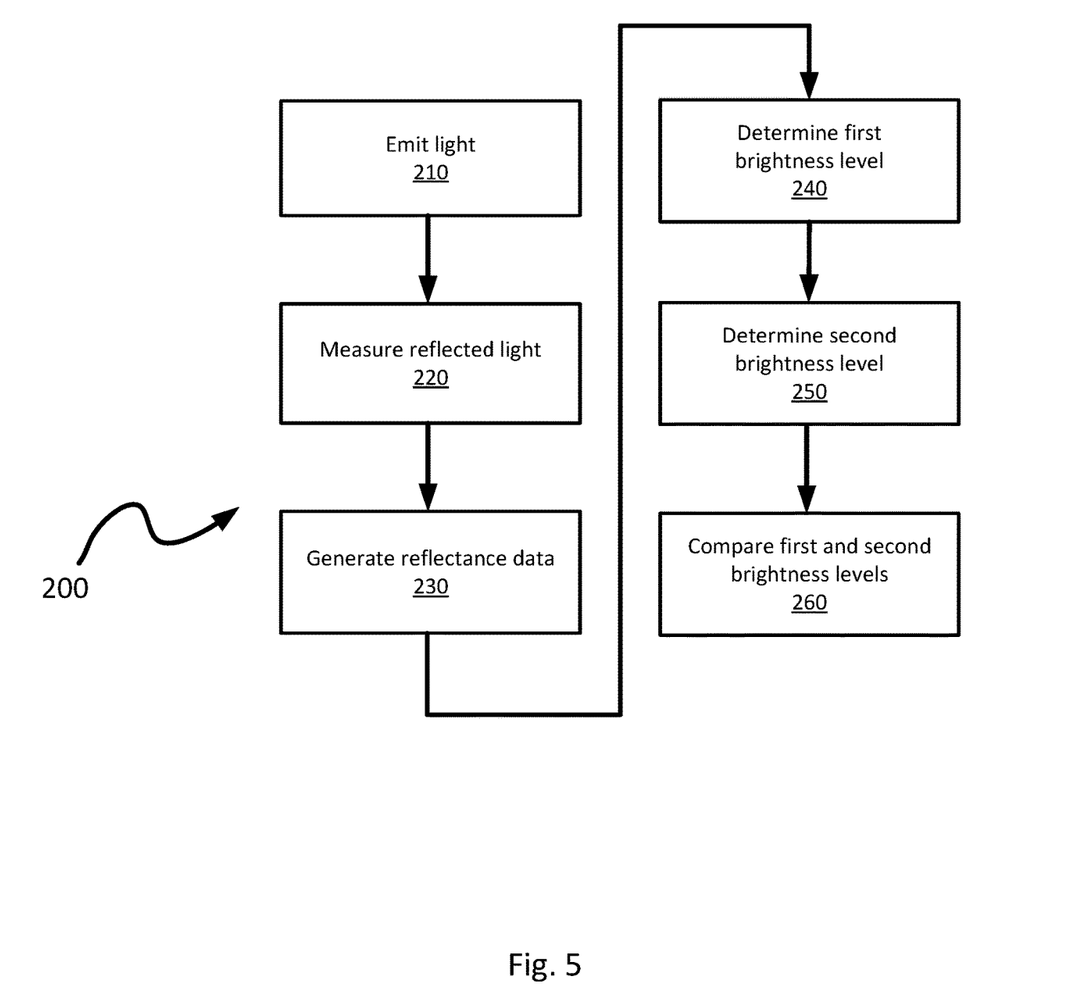
FIG. 5 is a flowchart of an example of a method.

Referring to FIG. 5, a flowchart of a method to calibrate an apparatus 50a is shown at 200. In order to assist in the explanation of method 200, it will be assumed that method 200 may be performed with the apparatus 50 or 50a, and specifically by the processor 100 or 100a. Indeed, the method 200 may be one way in which apparatus 50 and 50a may be configured. Furthermore, the following discussion of method 200 may lead to a further understanding of the processor 100 and 100a, and the apparatus 50 and 50a along with their various components.

Beginning at block 210, the processor 100a directs the illuminator 55a to emit light onto a media 90 to be printed on. The manner by which the processor 100a directs the illuminator 55a is not particularly limited. For example, the illuminator 55a may include a separate microprocessor (not shown) to control light emission. In such an example, the processor 100a may send a command to the illuminator 55a to emit light at a given brightness level. In other examples, the processor 100a may directly provide a current to the illuminator 55a to power a light emitting diode.

Next, at block 220, the optical sensor 60a measures reflected light. In the present example, the optical sensor 60a may simply measure light incident on the optical sensor 60a after reflection off the media 90. In particular, the present example involves alignment of the media 90 under the path of light from the illuminator 55a to the optical sensor 60a as shown in FIG. 4.

Block 230 generates reflectance data based on the reflected light measured by the optical sensor 60a. In the present example, the raw data collected by the optical sensor 60a is received by the processor 100a and converted into an intensity measurement to be stored on the memory 105a. In some examples, the raw data may be in the form of a voltage and directly recorded into the memory 105a to generate the reflectance data. In other examples, the raw data may be processed prior to storage as reflectance data.

In block 240, the processor 100a determines a brightness level at which the illuminator 55a emits light to generate reflected light at the optical sensor 60a with an intensity within a range that corresponds to a high sensitivity range. In the present example, the optical sensor 60a responds to incident light intensity in a substantially linear manner so that any change in the incident intensity provides a change in the response. This change in the response allows for accurate measurements on the change in reflectance of the light off the media 90, such as near the edge of the media 90.

The manner by which the brightness level for high sensitivity at the optical sensor 60a is determined is not limited and may include a wide variety of methods. For example, the illuminator 55a and optical sensor 60a may be pre-calibrated based on a plurality of standard setups which include known types and model of the illuminator 55a, the optical sensor 60a and the print system configuration. In this example, the determination may be made by reference to a value in a table stored in the memory 105a. As another example, the processor 100a may carry out a calibration algorithm to determine the brightness level based on real time data from the optical sensor 60a.

Block 250 determines another brightness level based on a signal to noise ratio. In particular, the brightness level is determined to be the highest brightness level at which the illuminator 55a may emit light while the reflected intensity provides a signal below a predetermined signal to noise ratio threshold. The threshold value is not limited and may be based on a variety of factors, such as factors related to the ability of the optical sensor 60a to distinguish a signal from background noise. In the present example, the processor 100a may direct the illuminator 55a to emit light at a low brightness level and increase the brightness level of the illuminator 55a in an iterative manner until the signal to noise ratio reaches the threshold value.

In block 260, the processor 100a compares the brightness levels obtained from block 240 and block 250 to determine whether to proceed with detection of an edge of the media 90 via the emission of light from the illuminator 55a at the brightness level determine at block 250. For example, the brightness level from block 250 may be compared with the brightness level of block 240 to establish that the brightness level from block 250 meets a relative minimum brightness threshold. The minimum brightness threshold is not limited and may be set to be the same as the brightness level from block 240, or higher or lower than the brightness level from block 240. In the present example, the threshold is set to be higher than brightness level from block 240 to ensure that the reflected light will be received at the optical sensor 60a with sufficient intensity above the high sensitivity range to obtain accurate measurements of the edge of the media 90.

Figure 6:
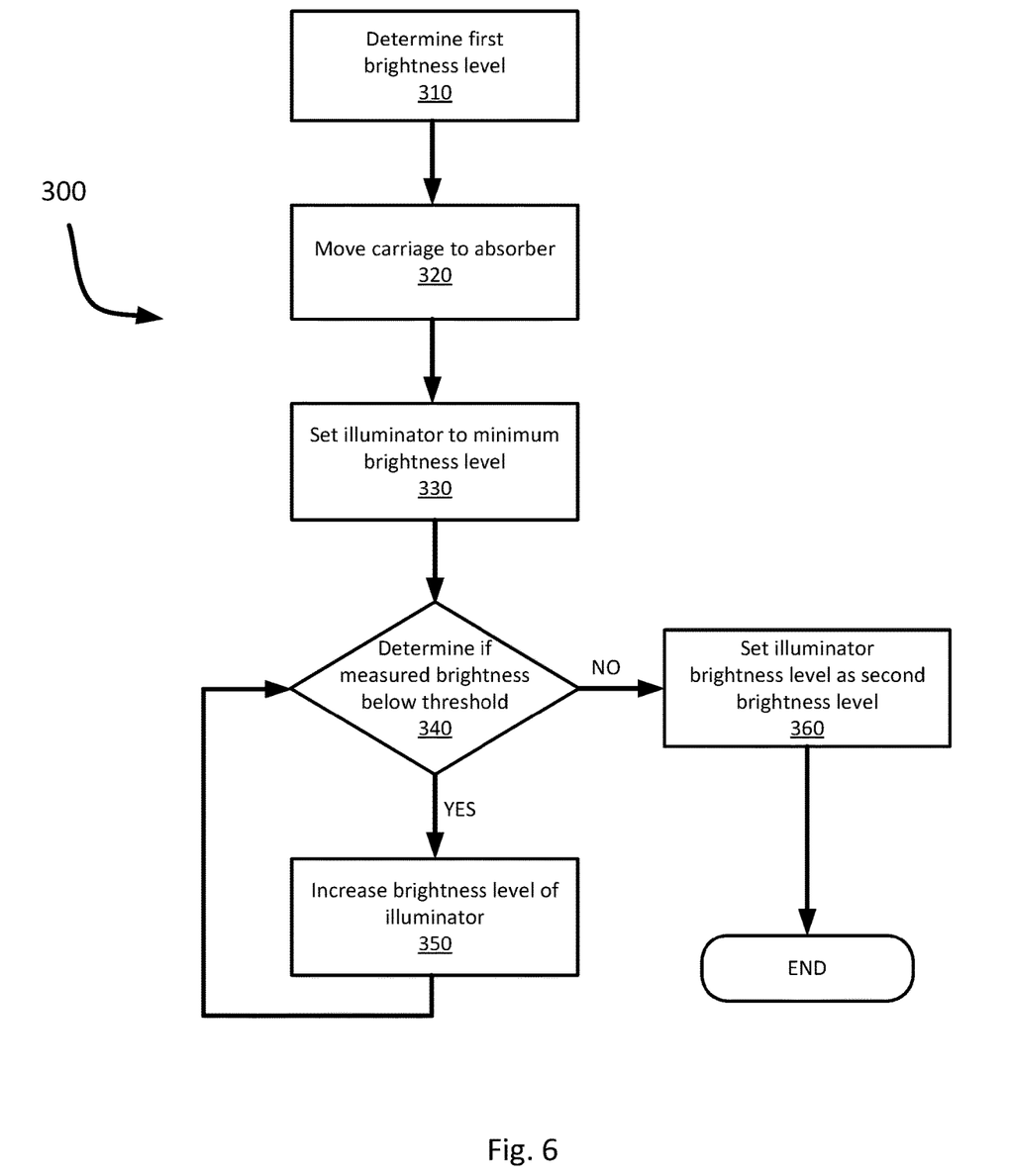
FIG. 6 is a flowchart of another example of a method.

Referring to FIG. 6, a flowchart of another method to calibrate an apparatus 50a is shown at 300. In order to assist in the explanation of method 300, it will be assumed that method 300 may be performed with the apparatus 50 or 50a, and specifically by the processor 100 or 100a. The method 300 may be just one way in which apparatus 50 and 50a may be configured. Furthermore, the following discussion of method 300 may lead to a further understanding of the processor 100 and 100a, and the apparatus 50 and 50a along with their various components.

In block 310, the processor 100a determines a brightness level at which the illuminator 55a emits light to generate reflected light at the optical sensor 60a with an intensity within a range that corresponds to a high sensitivity range. In the present example, the carriage 65a is positioned directly over the media 90 such that the optical sensor 60a receives incident light reflected off the surface of the media 90. The amount of incident light received at the optical sensor 60a may be adjusted via adjustment of the brightness level of the emitted light from the illuminator 55a. The processor 100a then determines the brightness level at which the illuminator 55a emits light that provides the highest sensitivity at the optical sensor 60a by monitoring the response of the optical sensor 60a to a change in the brightness level of the illuminator 55a.

Block 320 moves the carriage 65a from the position above the media 90 to another position. In the present example, the carriage 65a may be moved along the guide bar 75a to a position away from the media 90 such that the carriage 65a is in a position above an absorber, such as the platen 95. In the present example, the platen 95 includes an absorbing material to absorb emitted light from the illuminator 55a and reduces any reflected light back to the optical sensor 60a. In other examples, the finish of the surface of the platen 95 may act as an absorber. Accordingly, most of the light that is to be measured by the optical sensor 60a in this position may be attributed to noise.

In block 330, the processor 100a directs the illuminator 55a to emit light at the minimum brightness level at which the illuminator 55a is capable of operation. The emitted light is directed to the optical sensor 60a where an intensity of the light incident on the optical sensor 60a is recorded.

Block 340 determines if the brightness level at block 330 is below a threshold value. The threshold value and how it is determined is not particularly limited. For example, the threshold value may be a voltage value from an analog to digital converter. In particular, when a 9 bit analog to digital converter with a 3.3V reference voltage is used, the threshold value may be set about 0.26V. It is to be appreciated that these values are highly dependent on the setup, such as the application specific integrated circuit used. If the brightness level at block 330 is below the threshold value, the method 300 proceeds to block 350 where the processor 100a directs the illuminator 55a to increase the brightness level. The amount that the illuminator 55a to increase the brightness level is not limited. For example, the illuminator 55a may increase the brightness level by a fixed small increment, or fixed large increments. In other examples, the increment by which the illuminator 55a increases the brightness level may not be fixed and may be variable, such as dependent on how close the measured brightness level is to the threshold value. After block 350 is executed, the method 300 returns to block 340 where another determination is made. This iterative loop is repeated until the brightness level of the noise received at the optical sensor 60a reaches the threshold value. Once the threshold value is reached, the method 300 proceeds to block 360 where the brightness level of the illuminator 55a is set to be the brightness level associated with the signal to noise ratio.

Figure 7:
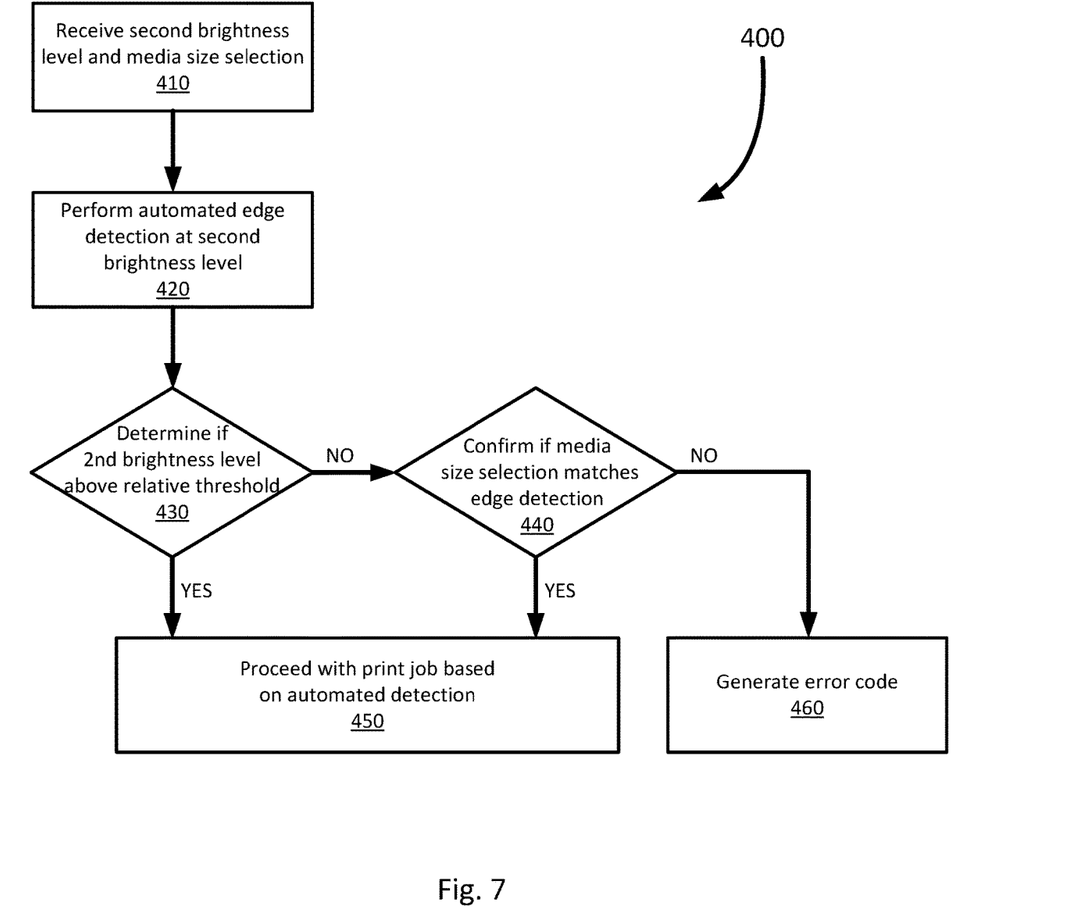
FIG. 7 is a flowchart of another example of a method.

Referring to FIG. 7, a flowchart of a method to verify a calibration performed with the apparatus 50a is shown at 400. In order to assist in the explanation of method 400, it will be assumed that method 400 may be performed with the apparatus 50 or 50a, and specifically by the processor 100 or 100a. The method 400 may be just one way in which the apparatus 50 and 50a may be configured. Furthermore, the following discussion of method 400 may lead to a further understanding of the processor 100 and 100a, and the apparatus 50 and 50a along with their various components.

In block 410, the processor 100a receives data that corresponds to the brightness level associated with the signal to noise ratio. For example, the brightness level obtained by the execution of block 250 or the brightness level obtained at block 360. The processor 100a further receives a media size selection or measurements to describe the size of the media. In the present example, the media size selection may be received as data via the network communication interface 120a from an external computer operated by a user. As another example, the media size selection may be received by the processor 100 from an input/output device 120 directly on the apparatus 50.

Block 420 performs an automated edge detection. The manner by which the edge detection of the media 90 is carried out is not particularly limited. For example, the carriage 65a may be moved along the guide bar 75a until the edge of the media 90 is reached. In this example, since the media 90 reflects light and the platen 95 absorbs light, the light detected at the optical sensor 60a from the illuminator 55a will decrease once the carriage 65a is no longer over the media 90. Rollers (not shown) may be controlled by the controller 52a and used to move the media 90 in a direction perpendicular to the guide bar 75a such that all the edges of the media size may be determined.

Block 430 determines if the brightness levels based on the calibrations, such as the brightness level determined at block 250 is relative to a threshold value determined base on the brightness level determined at block 240. The exact threshold is not limited and may be set to be the brightness level determined at block 240, or higher or lower than this value. This threshold value and how it is determined is also not particularly limited and dependent on the setup, such as the application specific integrated circuit used. If the brightness level determined at block 250 is above the relative threshold value, the method 400 proceeds to block 450 where the print job proceeds without further input from a user. In effect, this determination establishes that the illuminator 55a and the optical sensor 60a are sufficiently calibrated such that the accuracy is to be relied upon. Accordingly, the threshold value may be set to be higher to further decrease the chance of a false positive.

If the brightness level determined at block 250 is not above the relative threshold value, the method 400 proceeds to block 440. As a verification step, the processor 100a compares the media size based on edge detections at block 420 matches with the data received in block 410 from a user. If the processor 100a determines that a match exists, the method proceeds to block 450 where the print job proceeds with further input from a user. Alternatively, if the processor 100a determines that no match exists, the method proceeds to block 460 where an error code is generated to the user to prompt for additional input or user intervention. In other examples, instead of generation of an error code, the processor 100a may prompt a user for a confirmation of the media size or simply cancel the print job.

Various advantages will now be apparent to a person of skill in the art. For example, the apparatus and method provide a calibration method that addresses noise issues to select a brightness level of an illuminator for improved media edge detection. In addition, a method is provided to verify media size selection to reduce costs associate with poor print jobs based on inaccurate edge detections. In particular, the illuminator is automatically set to avoid saturation of the optical sensor 60a with noise.

It should be recognized that features and aspects of the various examples provided above may be combined into further examples that also fall within the scope of the present disclosure.

What is claimed is:

1. An apparatus comprising:
an illuminator to emit light on a media to be printed on;
an optical sensor disposed proximate to the illuminator to detect an amount of reflected light; and
a processor to control the illuminator and the optical sensor, wherein the processor is to:
calibrate the illuminator to determine a first brightness level for high sensitivity at the optical sensor while the illuminator is positioned over the media;
calibrate the illuminator to determine a second brightness level iteratively based on a signal to noise ratio while the illuminator is positioned over an absorber;
set a brightness of the illuminator to the second brightness level in response to the second brightness level exceeding a brightness threshold; and
proceed with detection of an edge of the media using the second brightness level of the illuminator.

2. The apparatus of claim 1, further comprising a cover to protect the optical sensor and the illuminator.

3. The apparatus of claim 1, further comprising:
a guide bar; and
a carriage slidably mounted on the guide bar, wherein the carriage supports the illuminator and the optical sensor.

4. The apparatus of claim 3, further comprising a printhead mounted on the carriage, wherein the printhead is mounted at a fixed relative position to the illuminator and the optical sensor.

5. The apparatus of claim 1, wherein processor is to receive an input representing a media size, the processor to verify the input corresponds with the edge detected.

6. The apparatus of claim 1, wherein the absorber is an absorbing material to absorb light emitted from the illuminator to reduce reflected light back to the optical sensor.

7. The apparatus of claim 1, wherein the absorber is a platen of the apparatus.

8. A method comprising:
emitting light using an illuminator onto a media to be printed on;
measuring reflected light from the illuminator using an optical sensor;
generating reflectance data based on the reflected light measured by the optical sensor;
determining a first brightness level while the illuminator is positioned over the media at which the illuminator emits light such that the reflected light is within a reflected brightness range corresponding to a high sensitivity range of the optical sensor;
determining a second brightness level while the illuminator is positioned over an absorber at which the illuminator emits light such that the reflected brightness range is below a predetermined signal to noise ratio threshold;
setting a brightness of the illuminator to the second brightness level in response to the second brightness level exceeding a brightness threshold; and
proceeding with detection of an edge of the media using the second brightness level of the illuminator.

9. The method of claim 8, further comprising mounting the illuminator and the optical sensor on a carriage, wherein the carriage is slidable along a guide bar.

10. The method of claim 9, further comprising mounting a printhead on the carriage, wherein the printhead is mounted at a fixed relative position to the illuminator and the optical sensor.

11. The method of claim 10, wherein the carriage is movable along the guide bar between a first position to determine the first brightness level and a second position to determine the second brightness level.

12. The method of claim 11, wherein the first position is over the media and the second position is over the absorber.

13. The method of claim 8, wherein determining a first brightness level comprises adjusting the reflected brightness range to be within a substantially linear response region of the optical sensor.

14. The method of claim 13, wherein determining a second brightness level comprises increasing the reflected brightness range iteratively until the predetermined signal to noise ratio threshold is reached.

15. The method of claim 8, further comprising:
receiving an input representing a media size; and
verifying the input corresponds with a detected edge.

16. A non-transitory machine-readable storage medium encoded with instructions executable by a processor, the non-transitory machine-readable storage medium comprising:
instructions to emit light on a media to be printed on using an illuminator;
instructions to receive reflectance data from an optical sensor, wherein the reflectance data represents an amount of reflected light received at the optical sensor from the media;
instructions to determine a first brightness level while the illuminator is positioned over the media at which the illuminator emits light such that the reflectance data is in a high sensitivity range;
instructions to determine a second brightness level while the illuminator is positioned over an absorber at which the illuminator emits light such that the reflectance data is below a predetermined signal to noise ratio threshold;
instructions to set a brightness of the illuminator to the second brightness level in response to the second brightness level exceeding a brightness threshold; and
instructions to proceed with detection of an edge of the media using the second brightness level of the illuminator.

17. The non-transitory machine-readable storage medium of claim 16, further comprising instructions to receive an input representing a media size, and instructions to verify that the input corresponds with a detected edge.

* * * * *